April 24, 1956

E. L. CHATTERTON ET AL 2,743,419

FREQUENCY MEASURING APPARATUS

Filed Oct. 4, 1950

INVENTORS
E. L. CHATTERTON
A. S. HEGEMAN, JR.
BY *W. C. Parnell*
ATTORNEY

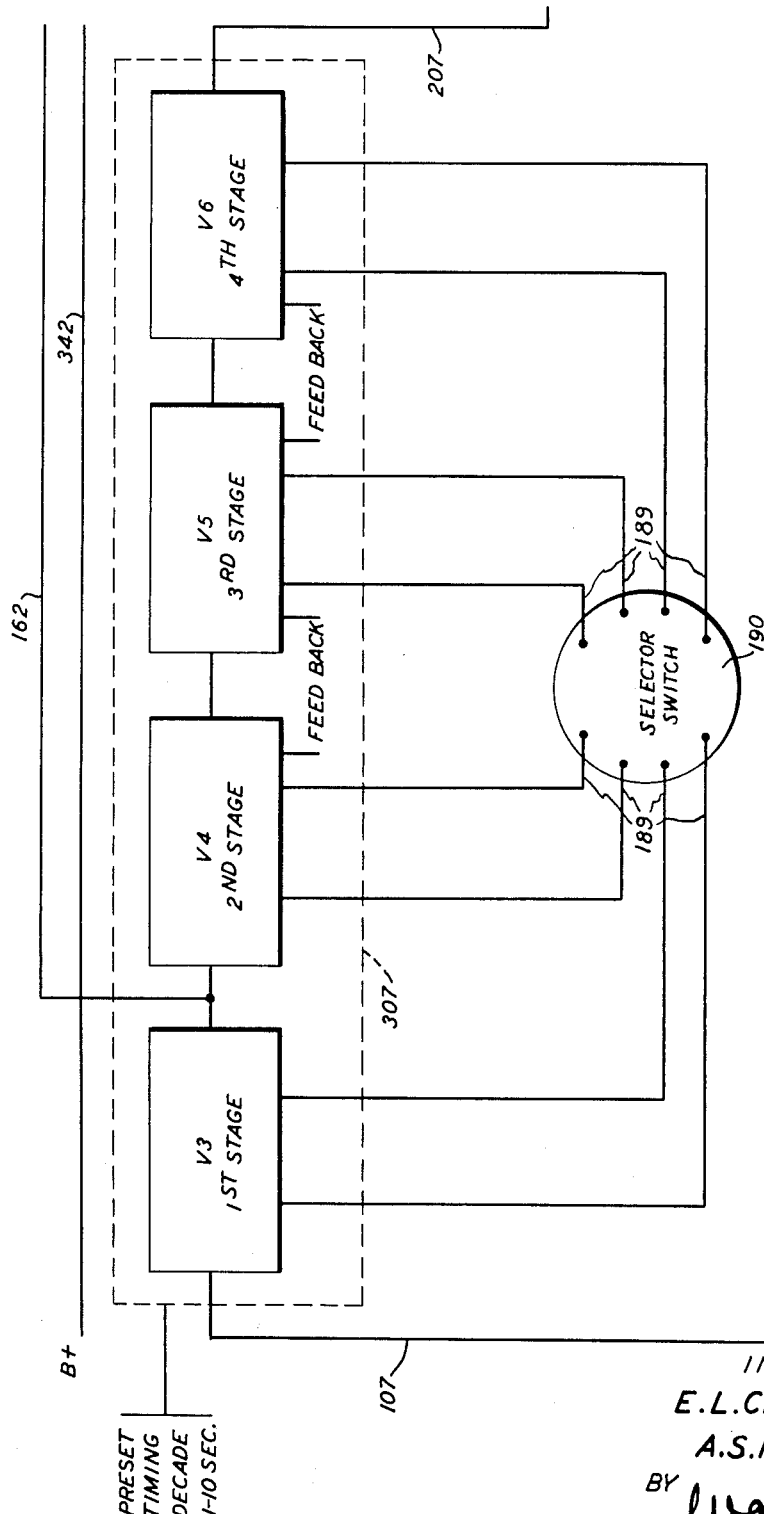

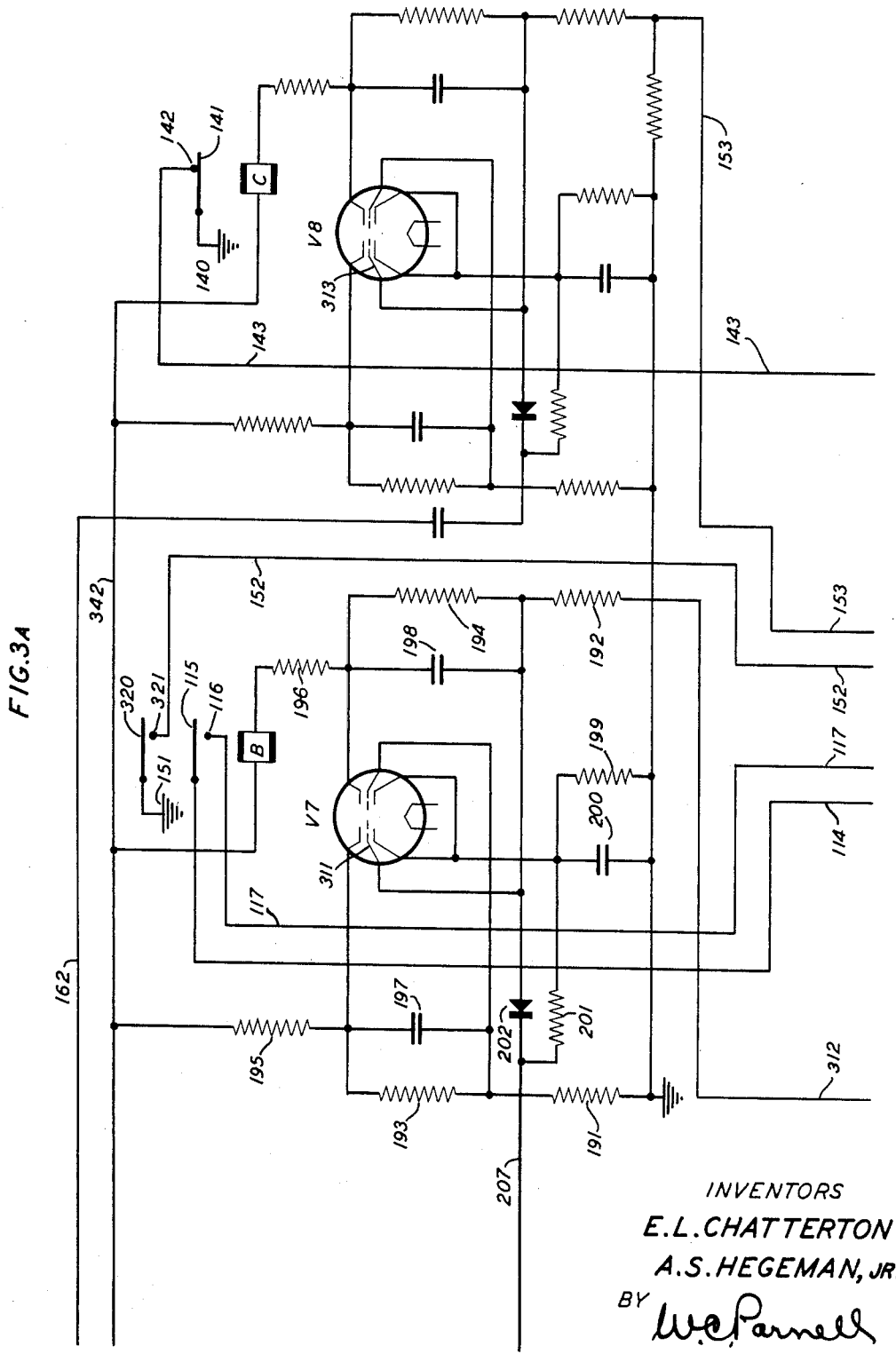

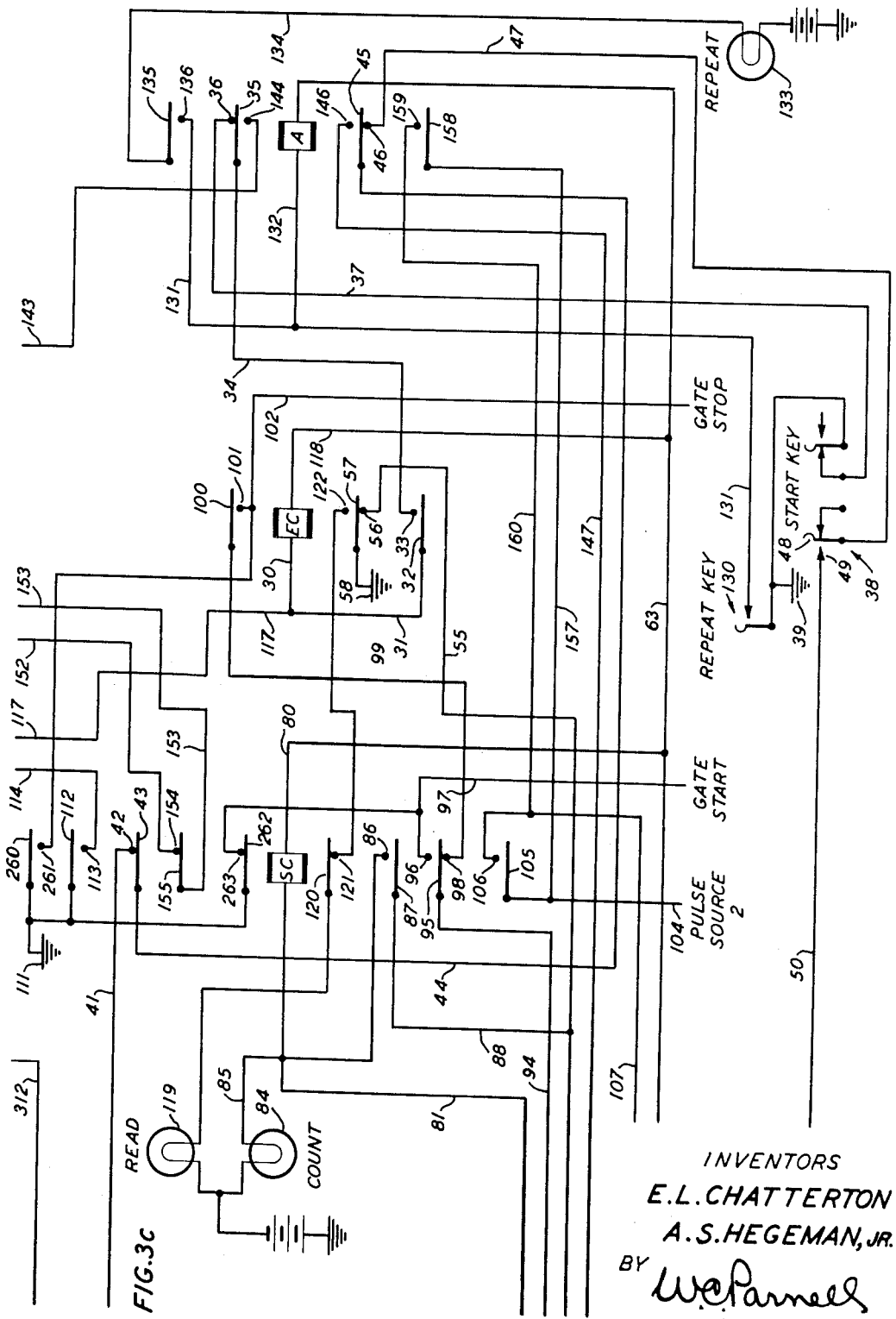

FIG. 4 — OPERATING SEQUENCE SINGLE MEASUREMENTS

| OPERATION | W RELAY | Z RELAY | R RELAY | SC RELAY | EC RELAY | A RELAY | B RELAY | C RELAY | GATE CIRCUIT | PRESET TIMING DECADES | COUNTER DECADES | COUNT LAMP | READ LAMP | REPEAT LAMP |
|---|---|---|---|---|---|---|---|---|---|---|---|---|---|---|
| PRESS START KEY | | | | | R | | | | | | | | OFF | |
| | O | | O | | | | | | | | | | | |
| RELEASE START KEY | | | | | | | RESET | | RESET | RESET | RESET | | | |
| | | O | R | O | | | ENABLE | | ENABLE | ENABLE | | | | |
| TIMER PULSES | | | | | | | | | | | | ON | | |
| Nth TIMER PULSES | | | | | | | | | OPEN | COUNT PULSES | COUNT CYCLES | | | |
| | | | | | | | | | | PULSES | | | | |
| | | | | | O | | O | | | | | OFF | ON | |
| N+1 TIMER PULSE | R | R | | R | | | | | CLOSE | STOPS COUNT | STOPS COUNT | | | |
| | | | | | | | | | | DISPLAY | DISPLAY | | | |

April 24, 1956  E. L. CHATTERTON ET AL  2,743,419
FREQUENCY MEASURING APPARATUS
Filed Oct. 4, 1950  9 Sheets-Sheet 7

| | OPERATE REPEAT KEY | N+2 TIMER PULSE | | | | TIMER PULSES | Nth TIMER PULSES | N+1 TIMER PULSE | | |
|---|---|---|---|---|---|---|---|---|---|---|
| W RELAY | | | | O | | | | R | | |
| Z RELAY | | | | | O | | | R | | |
| R RELAY | | | O | R | | | | | | |
| SC RELAY | | | | | O | | | R | | |
| EC RELAY | | R | | | | | O | | | |
| A RELAY | O | | | | | | | | | |
| B RELAY | | | | ENABLE | | | O | | | |
| C RELAY | | O | RESET | | | | | ENABLE | | |
| GATE CIRCUIT | | PULSES | RESET | ENABLE | | | OPEN COUNT PULSES/CYCLES | PULSES | CLOSE | |
| PRESET TIMING DECADES | | | RESET | | | | | | STOPS COUNT | DISPLAY |
| COUNTER DECADES | | | | | | ON | | OFF | | |
| COUNT LAMP | | | | | | ON | | OFF | | |
| READ LAMP | | OFF | | | | | | ON | | |
| REPEAT LAMP | ON | | | | | | | | | |

FIG. 5

OPERATING SEQUENCE REPEATED MEASUREMENTS

INVENTORS
E. L. CHATTERTON
A. S. HEGEMAN, JR.
BY W. C. Parnell
ATTORNEY

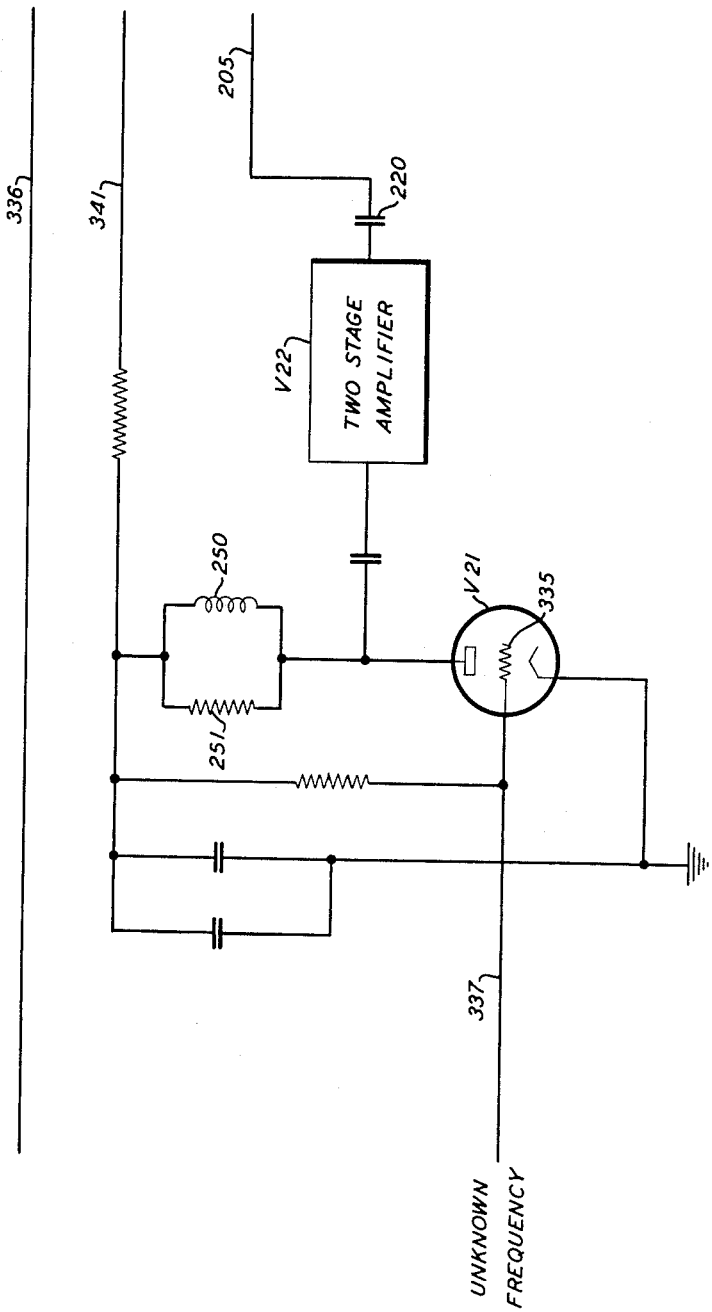

April 24, 1956 E. L. CHATTERTON ET AL 2,743,419
FREQUENCY MEASURING APPARATUS
Filed Oct. 4, 1950 9 Sheets-Sheet 9

INVENTORS
E.L.CHATTERTON
A.S.HEGEMAN, JR.
BY W.C.Parnell
ATTORNEY

United States Patent Office 2,743,419
Patented Apr. 24, 1956

2,743,419

FREQUENCY MEASURING APPARATUS

Earl L. Chatterton, Bloomfield, and Andrew S. Hegeman, Jr., Glen Ridge, N. J., assignors to Western Electric Company, Incorporated, New York, N. Y., a corporation of New York Application October 4, 1950, Serial No. 188,456

5 Claims. (Cl. 324—78)

This invention relates to the measurement of frequencies and particularly to making such measurements by counting cycles over a definite time interval.

Standard techniques for determining the frequency of an oscillatory system are usually based on the comparison of the unknown frequency with a known signal. This method, which involves heterodyning the unknown frequency with known frequencies to obtain a measurable beat note, along with comparison of oscilloscope patterns, is laborious and time consuming. In addition, this measuring procedure introduces operator judgment as a factor in the accuracy of the measurement, which often results in inaccurate readings and makes the method unsuitable for work requiring a high degree of accuracy.

There has therefore been a need for frequency measuring apparatus which would determine both quickly and accurately the frequency of an oscillatory system, and it is the object of this invention to provide such a measuring system.

Applicants accomplish their object according to the invention by automatically counting the cycles of the unknown signal for a definite time interval. By the mere operation of a pushbutton, the unknown frequency is accurately counted and displayed on a counting unit.

More specifically, a sharply defined pulse occurring periodically, such as once each second, is obtained from a standard frequency source. The unknown frequency to be counted is fed into the system and is amplified and shaped to give a series of sharp pulses suitable for actuating a counting unit, these pulses corresponding to the frequency of the unknown signal. Before reaching the frequency counting unit, the pulses of the unknown frequency pass through a gate circuit which is opened and closed by desired timing pulses through a control circuit. The unknown signal is therefore counted only during an exactly timed interval and the count displayed on the decades is an accurate reading of the unknown frequency for the counting interval chosen.

Means are provided for selectively setting the counting interval at any desired value according to the degree of accuracy required. This value may range, for example, between 1 and 100 seconds. In general, this is accomplished by opening the gate on a given pulse and setting the circuit so that the gate will be closed by a preselected succeeding pulse.

A convenient feature of the invention is means for selectively setting the system to operate either to display the count indefinitely until reset or to recycle automatically and display each count for an interval convenient for observation.

The system is such that by proper choice of the length of the counting interval, the measurement errors inherent in prior methods can be so reduced that the accuracy of measurement is limited essentially only by the accuracy of the standard frequency.

An important feature of the invention is the provision of means for preventing the gate circuit from affecting the accuracy of the count by the elimination of switching transients which might occur as the functional byproduct of the switching action.

Other objects and advantages will be apparent from the following detailed description taken in conjunction with the attached drawings in which.

Figure 2:
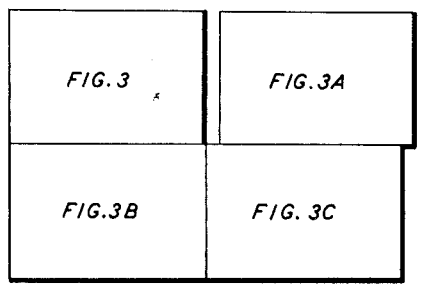
Fig. 2 is a chart of the layout of Fig. 3.
Figure 6A:
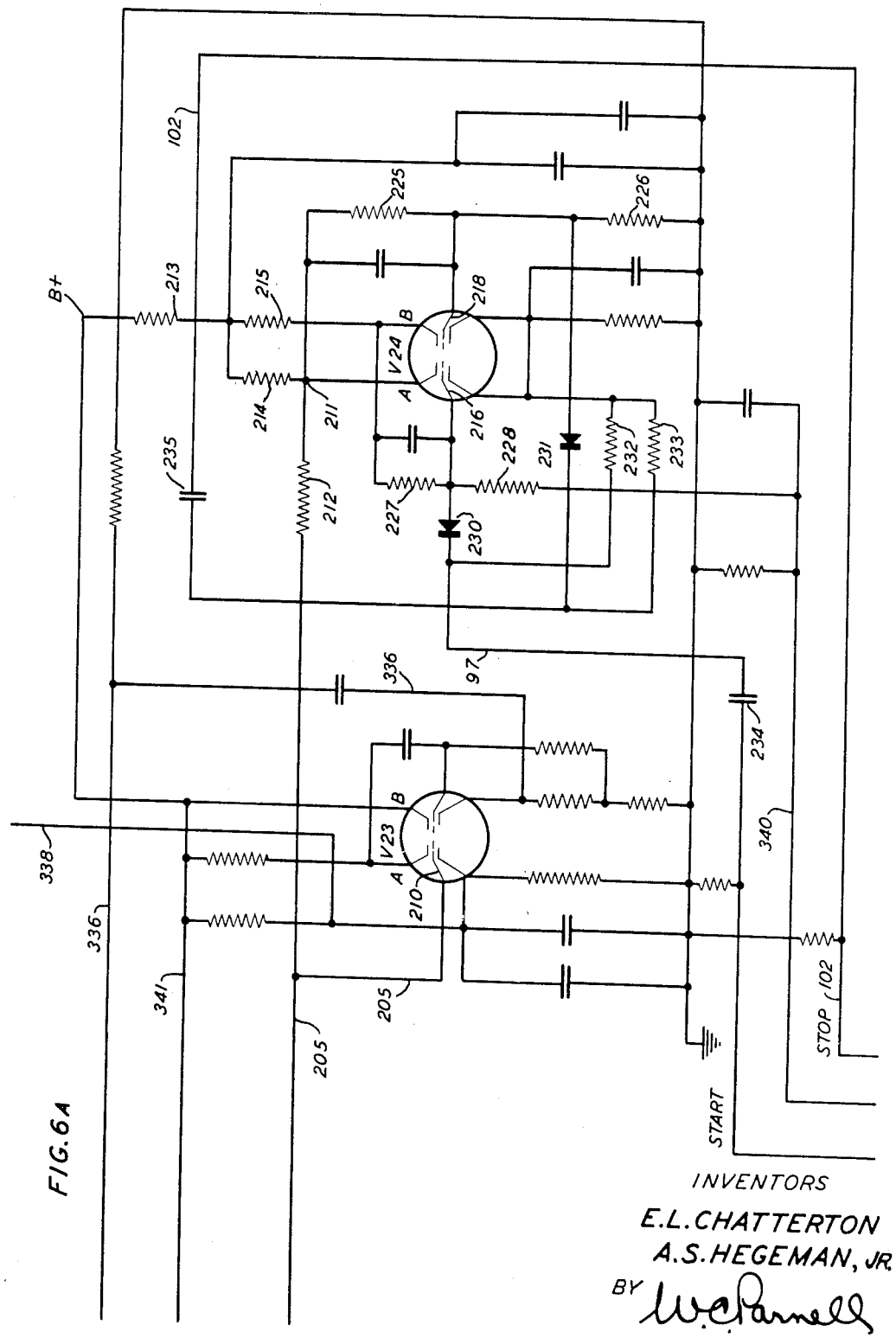

Figs. 3, 3A, 3B and 3C when arranged as shown in Fig. 2 form a schematic wiring diagram of the control circuit for the timing pulses;

Fig. 4 is a chart showing the sequence of operation in making single measurements;

Fig. 5 is a chart showing the sequence of operation in making repeated measurements; and Figs. 6 and 6A form, when Fig. 6 is positioned to the left of Fig. 6A, a schematic wiring diagram of the pulsing and gate circuits.

Figure 1:
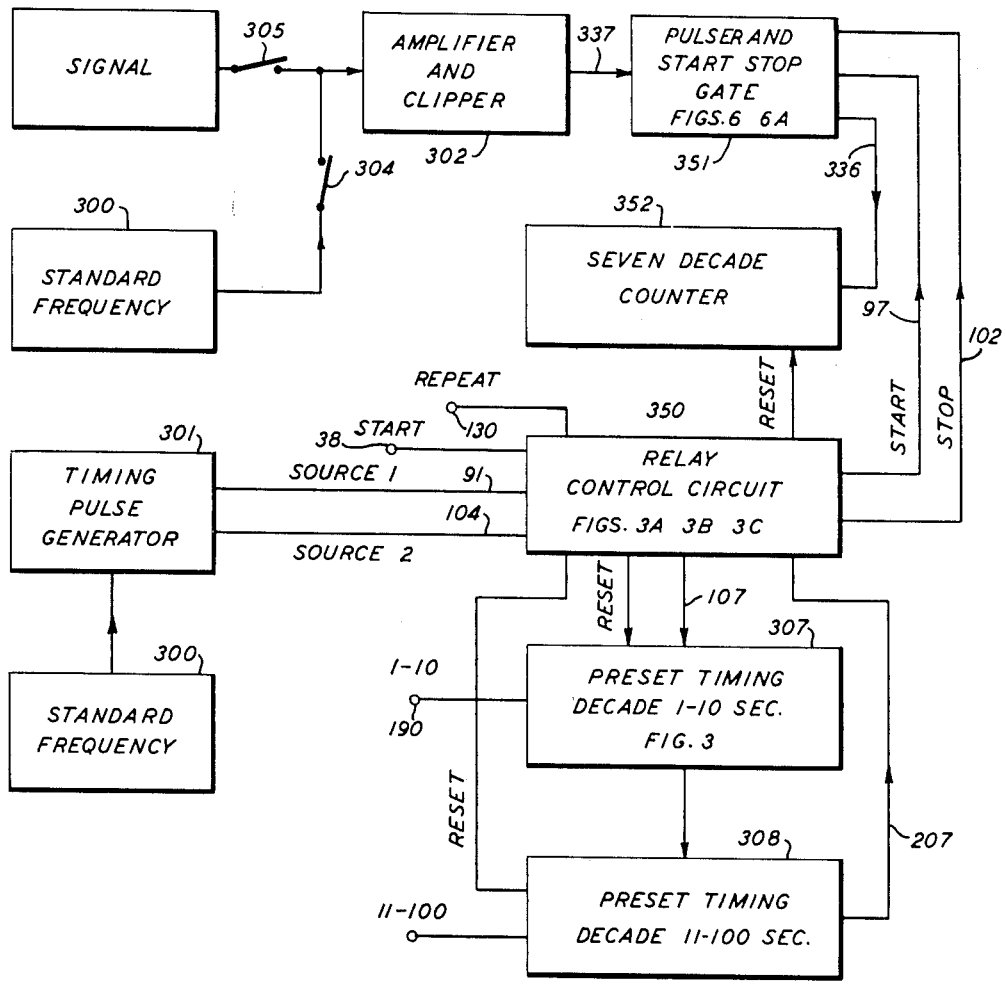
Fig. 1 is a schematic block diagram of the measuring system.

With reference to Fig. 1, the timing pulses are obtained from any available standard frequency source 300, this signal being fed through the timing pulse generator 301. This frequency should preferably be high, for example one megacycle, in order to obtain a timing pulse having the sharp definition required to provide an accurate time interval for the unknown frequency to be counted. If a one megacycle frequency is not available, the standard frequency may be multiplied to this value by any conventional frequency multiplying means. This one megacycle input frequency may be amplified as required before entering the timing pulse generator.

The timing pulse generator may be any means for providing a periodic accurately timed pulse. One circuit suitable for the purpose is the subject of copending application, Serial No. 188,457, filed October 4, 1950, now Patent No. 2,606,288 and is described there in detail. In general, the circuit uses a plurality of decades similar to those used for counting the unknown frequency in combination with a set of backwardly cascaded trigger circuits to produce a timing pulse occurring exactly once per desired unit of time, usually once per second.

The timing pulse thus obtained is amplified and made available through two outputs which pass through a control circuit 350. One of these outputs, designated as source #2, feeds the preset timing decades 307 and 308 shown in Fig. 1, while the other, designated as source #1, feeds the start-stop gate controlling the passage of the signal to be counted. The outputs of the amplifier are of the cathode follower type, this type being used to isolate the preset timing decades from the gate circuit to prevent possible feedback between the two.

The actual counting portion of the apparatus is shown in block diagram form in the upper part of Fig. 1. The signal of the unknown frequency to be counted is first fed into an amplifying and clipping circuit, the purpose of this circuit being to take an input sine wave, amplify it and provide a square wave output. The amplification is accomplished by first passing the input signal through germanium diodes or other rectifiers to eliminate the positive halves of the wave and provide a train of negative half sine waves. These are then fed into one or more stages of overdriven cathode coupled amplifiers 302 which not only amplify the signal but also clip the input wave to produce an output square wave. Gain in the order of 2,000 to 1 is used to give the necessary rapid rise time for the clipped part of the wave at the lower frequencies. The frequency counting apparatus covered by the present application is effective over a wide range, and since it is necessary to provide gain at the higher as well as at the lower frequencies, cathode-coupled type amplifiers are used to furnish such gain, conventional plate-coupled triode amplifiers being generally unsuitable for this purpose.

The counting apparatus will count an unknown frequency by direct reading up to approximately 1½ megacycles per second. Higher frequencies may be counted by the use of any suitable frequency dividing circuit which will bring the unknown frequency within the range of the counting apparatus. The amplifying and clipping circuit described above would act on the output of such a dividing circuit.

After being amplified and clipped, the unknown frequency signal passes into a pulsing circuit, the purpose of which is to transform the square wave output received into sharp, well-defined pulses suitable for actuating the counting decades. On leaving the pulsing circuit, the pulses of the frequency to be counted have to pass through a gate circuit 351 before reaching the counting decades 352. This gate circuit, which will be described in detail later in connection with Figs. 6 and 6A, acts as a valve and allows the incoming signal to reach the counting decades only during predetermined, accurate timing intervals. For example, if the unknown frequency is to be counted for one second, the gate circuit will open for this interval to allow the pulses to be counted. If the count is to be for ten seconds, the gate is caused to remain open for an exact period of ten seconds, etc.

The frequency counting unit used comprises seven counting decades to provide a seven figure count. These decades are connected in series with each decade after the first receiving of an output from the previous unit. Each individual decade comprises a conventional four-stage cascaded trigger circuit in which feedback is added between the second and third stages and between the third and fourth stages to reduce the normal sixteen counts to ten counts per decade output pulse and thereby convert the unit from the binary system to the decimal type. Germanium varistors are used throughout in a known manner to increase the speed of operation of the decade units and to reduce recovery time. The decades use a conventional count indicating system with neon lamps behind a numbered strip interconnecting the plate circuits to indicate the electrical positions of the decades. The individual decades may be set or reset to their zero position by momentarily removing the ground from the grid return of the appropriate half of each trigger circuit. The counter and decade units used are of the type described in the article entitled "Electronic counters" by I. E. Grosdoff, RCA Review, September 1946.

As the unknown frequency is allowed to reach the counting decades through the opening of the gate circuit for the predetermined timing interval, the frequency will be counted and the number of cycles counted will be displayed on the counting unit at the end of the interval, this number indicating the unknown frequency directly when the interval is one second. As explained later in connection with the control circuit, the count may be displayed indefinitely, or the cycle may be made repeating, in order to provide a recurring count.

Whenever it is desired to check the accuracy of the frequency counting unit, the standard frequency source used with the timing unit may be fed into the counter in place of the unknown frequency, as indicated in Fig. 1, by means of switches 304 and 305.

The relay control circuit and preset timing decades shown in block form in Fig. 1 are covered in detail in Figs. 3, 3A, 3B, and 3C. The function of this apparatus is to control the timing pulses and cause them to turn the gate circuit on and off at desired intervals.

Two types of operation are provided, manual and repeating. In the manual operation, the counting decades begin counting the unknown frequency after a start button has been pressed and display the count at the end of the desired time interval until the circuit is reset. In the repeating cycle, the counter also counts the unknown frequency for a desired time interval after the operation of a repeat key. The circuit in the repeat cycle is made automatic so that the count obtained is displayed for one second after which the circuit resets to zero and the counting cycle starts again.

The sequence of operation in making single measurements of an unknown frequency is shown in Fig. 4. With reference to this sequence and to the description which follows, it will be seen that the operation and release of the start key 38 (Fig. 3C) brings up relay SC, the start cycle relay, and closes circuits which allow the timing pulses from one source to reach the preset timing decades, and allow corresponding pulses from the second source to reach the start side of the gate circuit.

At the end of a particular count, relay EC (Fig. 3C) will be in an operated condition, and to start a new count, it is necessary to release this relay. The ground connection for relay EC, which is the end of cycle relay, extends through leads 30 and 31, contacts 32 and 33 of the relay, lead 34, contacts 35 and 36 of relay A, lead 37, and through the normal contacts of start key 38, to ground at 39. Opening of the start key 38 will break its normal contacts and remove ground from relay EC, thereby releasing it.

When relay EC releases, it provides a ground connection for relay R (Fig. 3B) through lead 41, normal contacts 42 and 43 of relay SC (Fig. 3C), lead 44 and contacts 45 and 46 of relay A, through lead 47 and contacts 48 and 49 of the operated start key, lead 50, normal contacts 51 and 52 of relay Z, leads 53, 54, and 55, and through contacts 56 and 57 of relay EC to ground at 58. This operating circuit for R extends through a plurality of contacts of other relays as described to insure that these relays are in the right condition and operate in the proper sequence. Battery from a source 61 (Fig. 3B) is applied to the relay R through leads 62, 63, and 64.

Figure 3B:
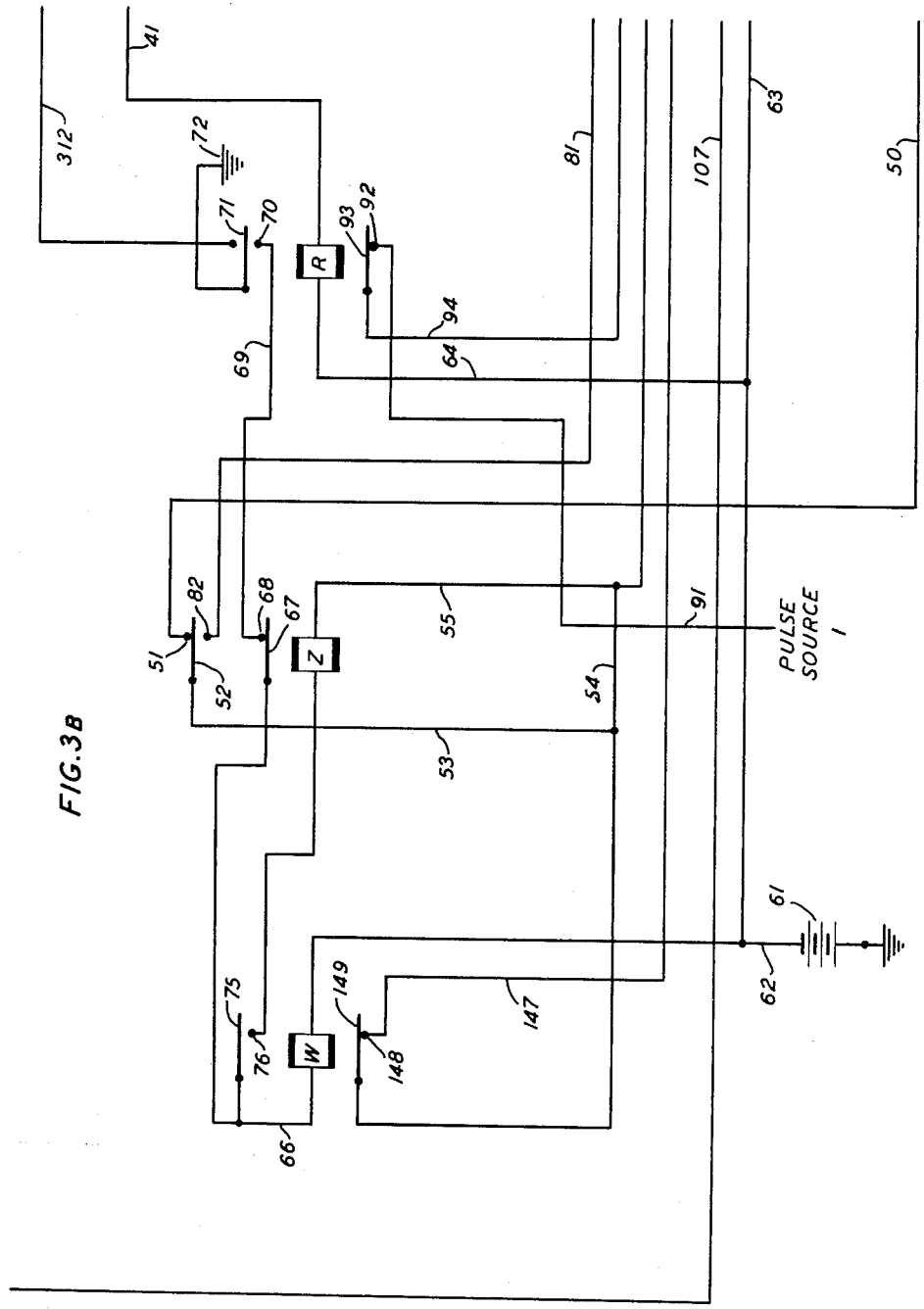

The main function of the R relay (Fig. 3B) is that of resetting. The operation of relay R accomplishes this resetting in a conventional manner by removing the ground connection at the point 72 from the proper grid circuits of the counting decades, the timing decades, the gate circuit, and relay B (Fig. 3A).

The operation of R also operates the W relay (Fig. 3B) by completing its circuit to ground through a path including leads 66, normal contacts 67 and 68 of relay Z, lead 69 and operated contacts 70 and 71 of relay R to ground at 72.

The sequence of events described above all happen on the pressing of start key 38 (Fig. 3C). It will be seen that relay R is held in operation on the contacts of the start key, and when the start key is released, this relay is also released.

The operating coil for relay Z (Fig. 3B) is placed in series with that of relay W through the operation of the latter and the closing of W contacts 75 and 76. The end of the operating coil for relay Z away from the series connection with W is connected to ground at 58 through a path including lead 55, and contacts 56 and 57 of relay EC (Fig. 3C). While the R relay is operated, ground is connected to both sides of the relay Z preventing its operation. However, when R is released, ground from the point 72 is removed from the relay Z, and it operates through its series connection with the relay W, as described above.

The release of R also restores to ground the grids of trigger circuits associated with the counting decades, timing decades, gate circuit and relay B so that these circuits may be operated by a proper pulse.

Relay SC (Fig. 3C), which starts the counting cycle, is connected to battery through lead 80. The operation of the relay Z completes the ground connection to relay SC to cause it operation through a circuit extending through lead 81, operated contacts 82 and 52 of relay Z, leads 53, 54, and 55, and through contacts 56 and 57 of relay EC to ground at 58. The operation of this relay lights the "count" lamp 84 through lead 85, operated contacts 86 and 87 of the relay, and through leads 88 and 55 to ground at 58.

With reference to Fig. 3B, it will be seen that the timing pulses from source #1 pass through lead 91, normal contacts 92 and 93 of relay R, and through lead 94 to contact 95 of relay SC (Fig. 3C). When relay SC is operated, these pulses pass through operated contacts 95 and 96 and lead 97 to the start side of the gate (Fig. 6A). When relay SC is released, these pulses pass through released contacts 95 and 98, lead 99, operated contacts 100 and 101 of relay EC and through lead 102 to the stop side of the gate circuit.

The pulses from source #2 (Fig. 3C) are allowed to reach the preset timing decades when SC is operated through lead 104, contacts 105 and 106 of the relay and lead 107, whereby they begin counting on the decade.

There are two timing decades 307 and 308 (Fig. 1) in the control circuit, each consisting of four double triode tubes which constitute the four stages of the decade. The first decade provides a time interval of from 1 to 10 seconds, and the second in combination with the first, allows an additional counting interval of from 11 to 100 seconds. In Fig. 3, only one timing decade is shown, this including tubes V3, V4, V5 and V6. The timing decades may be the same as the counting decades to simplify the maintenance problem, and in general serve the same function as the latter, that of counting pulses.

Whereas a decade normally would count ten pulses and cycle on the tenth pulse, it is possible in this system to preset the timing decades to any given electrical position at the time of reset by means of a selector switch 190 (Fig. 3) so that the unit will cycle on any desired number of pulses reaching it after the operation of relay SC. As shown in Fig. 3, the individual halves of the four trigger tubes representing the various stages of the timing decade are connected to the selector switch through leads 189. The selector switch is reset to its preset position by the operation of relay R.

With reference to the operation of the present timing decade, if a counting interval of 9 seconds is desired, the decade is preset to the first of its ten electrical positions, which means that the ninth pulse thereafter will cycle the decade. If it is desired to cycle the unit on the eighth pulse, it is preset to its second electrical position, etc. By the use of two timing decades acting in conjunction, it is possible to provide a counting interval for any time from 1 to 100 seconds.

The output of the timing decade is obtained from tube V6 (Fig. 3), and this output pulse is fed through lead 207 into trigger tube V7 (Fig. 3A). This tube is part of a conventional driven multivibrator, with the two halves of the tube balanced and with each half having its grid connected in the plate circuit of the other half so that when one half is conducting the other will be driven beyond cutoff to render it non-conducting. The conventional trigger circuit shown for the tube V7 includes voltage dividing resistors 191, 192, 193, and 194. Plate potential is provided through lead 342. Plate load resistances comprise resistor 195 for one-half of the circuit and resistor 196 plus the resistance of relay B for the other half of the circuit. Capacitors 197 and 198 are used in the usual manner to speed up the triggering action.

With reference to the trigger circuit associated with tube V7, the output pulse from tube V6 is in the form of a square wave. This square wave is differentiated by the trigger circuit into a sharp pulse which is then applied to the grid 311 of the left half of the tube. This pulse will drive the left side of the tube to cut off which means that the other half will be driven to conduction by the trigger action of the tube and cause plate current to flow in this half. Relay B is connected in the plate circuit of the right side of the tube, and will be energized by a flow of current in this half. The relay B will remain operative until the tube is reset by the operation of relay R, this being accomplished through conductor 312.

Operation of the B relay advances ground to operate relay EC from point 111 through contacts 112 and 113 of relay SC, lead 114, operated contacts 115 and 116 of relay B, and through lead 117 to one side of relay EC (Fig. 3C), the other side being connected to battery through leads 118 and 63. Operation of relay EC causes the release of relays SC, W, and Z by removing their ground connection from the point 58, and also lights the "read" lamp 119 (Fig. 3C) through released contacts 120 and 121 of relay SC and operated contacts 122 and 57 of relay EC.

When relay SC is released by the operation of EC, the "count" lamp is turned off, and the incoming pulses from source #2 are no longer able to reach the preset timing decade as its connecting path has been broken at contact 105 of the SC relay. The release of SC also causes its movable contact 95 to change the connection for the pulses from source #1 from the start position of the gate to the stop position of the gate so that the gate may be closed by the pulse next after the pulse which cycled the timing decade.

As soon as the relay EC operates, it locks in by being connected to ground point 39, through its own contacts 32 and 33, lead 34, contacts 35 and 36 of relay A, lead 37, and normal contacts of the start key 38. This relay therefore remains in operation until this ground is removed by pressing the start key to start another count. In beginning a count for the first time, relay EC will be of course released instead of in an operated condition. In this case, the relay merely remains released when the start key is pressed. However, any time that this relay is operated, it will be released by the start key, as it must be released for the remainder of the counting cycle to continue.

By means of the described counting apparatus, it is possible to count for $n$ number of seconds, $n$ being a whole number, ranging from 1 to 100 seconds. This range is obtained by cascading two timing decades 307 and 308 as shown in block diagram in Fig. 1. These timing decades are preset so that the $n$th pulse will cycle the second decade.

Where $n$ is equal to four, that is, when the pulses are to be counted for an interval of four seconds, the first timing decade is preset to position six. In other words, it is set to a position whereby the fourth incoming pulse after the operation of relay SC will cause it to pass through zero and cycle.

The sequence of operation for a count where $n$ is equal to four is as follows:

Pulse 1 from source #2 (Fig. 3C) counts on the timing decade while the corresponding pulse 1 from source #1 (Fig. 3B) passes through to the gate circuit to open it and start the count of the unknown frequency;

Pulses 2 and 3 count on the timing decade;

Pulse 4, the $n$th pulse, will cycle the timing decade;

The 5th or $n+1$ pulse (from source #1) closes the gate circuit and stops the count, which remains displayed on the counting decades.

Pulses 2, 3, and 4 from source #1 also reach the gate circuit and try to open the gate, but since the gate has already been opened by pulse 1, these pulses have no effect.

Where $n$ is equal to one second, pulses 2 and 3 as described in the sequence above are absorbed, and pulse 1 has the same function as pulses 1 and 4 in the example given.

It will be noted that the count of the unknown frequency lags one second behind the count on the preset timing decades. For example, where the counting interval is four seconds, the timing decade will cycle on the fourth pulse after the operation of the SC relay. However, the actual count of the unknown frequency does not start until the arrival of the first pulse, which opens the gate and allows the unknown frequency to reach the counting decades, and does not stop until the fifth pulse (i. e. $n+1$), which closes the gate circuit and prevents the unknown frequency from subsequently reaching the counting decades.

The W-Z relay combination is used in connection with the operation of the SC start relay in order to prevent accidental closing of the start key from affecting the circuit operation. After the W and Z relays have operated, the start key is eliminated from further consideration in the circuit. This is desirable not only from the standpoint of accidental operation but also because operation of SC by the release of the start key would not give the clean break needed for positive action.

The foregoing circuit description and sequence of operation has been on the basis of a manual, non-repeating measurement. It is also possible with the present circuit to provide a repeating cycle of operation to enable continuous measurements to be taken, the sequence for this cycle being shown in Fig. 5.

To switch the circuit over to a repeat cycle, repeat key 130 (Fig. 3C) is operated. This will energize relay A by providing a ground path from point 39 through the repeat key 130 and leads 131 and 132. Operation of relay A breaks the ground connection of relay EC to the point 39 and through contacts 35 and 144 and lead 143, provides a new ground at 140 extending through the released contacts 141 and 142 of relay C (Fig. 3A). Operation of this relay also lights "repeat" lamp 133 through lead 134, contacts 135 and 136 of the relay, and through lead 131 to ground at point 39. Relay A serves primarily to transfer the various functions of the start key 38 to relay C.

Assuming that $n$ is the selected time count interval in seconds, the count will be finished at the $n+1$ timer pulse the same as for the single measurement, and the count will be displayed on the counting decades. The $n+2$ timer pulse will cause the C relay to operate as later explained, and operation of this relay will in turn release the EC relay by breaking its lock-in path to ground at point 140.

When relay EC releases, it operates relay R, which is connected to battery through leads 64, 63, and 62, by providing a path to ground point 58 extending through lead 41, contacts 42 and 43 of SC, lead 44, operated contacts 45 and 146 of relay A, lead 147, contacts 148 and 149 of relay W, leads 54 and 55 and through contacts 56 and 57 of relay EC to ground at 58.

The operation of the R relay resets the counting decades, timing decades, gate circuit, and relay B as before by removing ground from their grid circuits so that they will be unaffected by incoming pulses. The resetting and release of relay B causes the release of relay C by removing ground from the grid 313 of tube V8 and thereby resetting the tube. This is possible since ground at point 151 for the grid of tube V8 extends through operated contacts 320 and 321 of relay B, leads 152 and 153 and released contacts 154 and 155 of the relay SC. The result is that the tube V8 is unbalanced throughout the counting interval, thereby preventing the operation of relay C during this period.

The operation of R causes the operation of relay W in the same manner as for the single measurement system by providing it with a path to ground at the point 72. The operation of W in turn releases the R relay since the ground path of the latter extends through the unoperated contacts 148 and 149 of the W relay. The release of R thereupon restores ground to the trigger circuit grids of the counting decades, timing decades, gate circuit and B relay to enable these units to be operated by suitable incoming pulses.

The next sequence of events is the same as for the single measurement operation. The release of R with W operated brings up relay Z, and the operation of Z brings up start relay SC. The operation of SC will close a circuit allowing pulses from source #2 to reach the timing decades and also closes a circuit enabling pulses from source #1 to reach the start side of the gate circuit.

As before, the first pulse after the operation of SC both opens the gate circuit to allow the unknown frequency to be counted to reach the counting decades and also counts on the preset timing decade. The preset decade is cycled by the $n$th pulse which results in the operation of relay B which in turn operates relay EC. The operation of EC releases relays W, Z, and SC, and the release of SC in turn enables the operation of C on a proper pulse by restoring ground to the grid circuit of tube V8. It also switches the connection from the start to the stop side of the gate. All of this sequence takes place on the $n$th pulse.

The $n+1$ pulse closes the gate circuit since the release of SC transferred the pulse connection from the start to the stop side of the circuit. The closing of the gate both stops the count and starts the display of the count.

In contrast to the single measurement system, the release of the relay SC does not break the circuit through which the pulses from source #2 reach the preset timing decade. The fact that relay A is operated enables these pulses to continue to reach the timing decade through leads 104 and 157, contacts 158 and 159 of relay A and through leads 160 and 107 to the decade. Therefore, incoming pulses from source #2 will continue to reach the preset timing decades and actuate its trigger circuits after the $n$th pulse has cycled the decade.

Since the decade has been cycled by the $n$th pulse, the $n+1$ pulse reaching the decade from source #2 causes the decade circuit to be in a position corresponding to a count of one, while the $n+2$ pulse causes the decade circuit to be in a position corresponding to a count of two. As will be seen from Figs. 3 and 3A, the output of the first stage, that is, tube V3, of the preset timing decade is fed through lead 162 to the grid 313 of tube V8 to trigger the tube and thereby operate relay C, located in the plate circuit of the tube, in a manner similar to that described in connection with relay B. However, this tube is unbalanced during the counting part of the cycle as the ground 151 for its grid 313 has been removed and it takes a combination of the operation of relay B and the release of relay SC to restore this ground and enable the plate circuit containing relay C to conduct and thereby energize the relay. When this condition is not present, tube V8 remains unbalanced and is unaffected by incoming pulses from tube V3. This right combination, i. e. B operated and SC released, is present on both $n+1$ and $n+2$ pulses. However, the circuit of tube V3 is set so that the $n+1$ pulse is of a polarity which will not cause the plate circuit containing relay C to conduct. However, the $n+2$ pulse is of the proper polarity for this purpose, and will cause plate current to flow and operate the relay. The trigger circuit elements for tube V8 and relay C correspond in function and value to those in the circuit of tube V7 and relay B.

As outlined above, the operation of C ends one counting cycle and begins another by releasing the EC relay which starts the sequence of events outlined in Fig. 5.

By making the $n+1$ pulse of a polarity which will not actuate tube V8, (Fig. 3A), a one second display time is provided. The time sequence of operation will therefore be a count for $n$ seconds, a display for one second, and a resetting period of one second, the latter taking place between the $n+2$ pulse and the next succeeding pulse which becomes the first pulse of the new count. By way of example, if the counting interval is five seconds, there would be a total of seven seconds and seven corresponding pulses in the complete cycle. Pulse 1 from source #1 will open the gate circuit to allow the unknown frequency to pass through to be counted on the frequency counting decades. The corresponding pulse 1 from source #2 will begin the count on the preset timing decade and pulse 5 will cycle it. The sixth or $n+1$ pulse from source #1 will close the gate while the $n+1$ pulse from source #2 will reach the preset decades but will have no effect as it will cause an output pulse of the wrong polarity. The seventh or $n+2$ pulse from source

2 will be of the proper polarity to cause an output pulse from tube V3 to actuate tube V8 and relay C and thereby end one counting cycle and start a new one. The count takes place between pulses 1 and 6 and is displayed between pulses 6 and 7, while the resetting action takes place between pulses 7 and 1.

In connection with the operation of the control circuit herein described, it should be pointed out that as the result of the operation of relay C, the timing decade is placed back in its present position, and not its zero position. This preset position would be seven for a counting interval of three seconds, six for a counting interval of four seconds, etc.

In the repeating cycle, the entire operation from the $n+2$ pulse through the operation of the relay SC and the resetting of relay C takes place in less than one tenth of a second, well within the one second interval between pulses. In the single measurement cycle, time is not critical and the start key may be held in as long as desired without affecting the operation of the circuit.

The "read," "count," and "repeat" lamps (Fig. 3C) described are not a functional part of the circuit, but are included to indicate which operation is going on at a given time.

With reference to the SC relay, it will be noted that contacts 260, 261, 262, and 263 have been included to provide paths to the ground point 111 from the start and stop leads to the gate circuit to prevent these leads from picking up false pulses from outside sources.

With reference to Figs. 6 and 6A, it has been shown heretofore that the unknown frequency was first amplified and clipped and then passed into a pulsing circuit for transforming the input square wave into sharp, well-defined pulses suitable for actuating the counting decades. This is accomplished by passing the signal through lead 337 into tube V21 which is a shock-excited oscillator having a critically damped coil in its plate circuit.

Tube V21 is normally conducting, but the incoming negative square wave pulses drive the grid 335 of tube V21 negative and the tube is driven to cutoff. If this cutoff is accomplished sharply enough, there is a sudden collapse of the magnetic field through the coil 250, this sudden collapse causing a sharp positive pulse. This coil is tuned by the inherent capacitance of the plate circuit, the resonant frequency being in the neighborhood of 2½ megacycles. A damping resistor 251 is used which precludes an undamped oscillator train, this resistor damping out the train within a half cycle.

When the input square wave goes in a positive direction, a negative pulse appears as an output of the tube. This pulse will not be as sharp as the positive pulse which is caused by the tube being cut off, inasmuch as the tube is cut off more quickly than it is driven to conduction.

The output pulse from tube V21 contains both positive and negative elements, and since a unidirectional pulse is needed, the output signal is fed into a two stage amplifier tube V22 having its first stage biased to cut off. This stage will therefore only conduct on the positive halves of the input signal, and, through its inherent inversion action, its output will be a unidirectional negative pulse. This pulse is again inverted in the second stage of V22 to give a positive output pulse.

These positive pulses from V22 are fed through lead 205 into the left half of tube V23 which is also an amplifier. The cathode of the left half of V23A is placed at approximately 125 volts above ground, and is connected through lead 338 to a suitable current bleeder resistor (not shown) which prevents variations in the anode current of V23A from affecting the cathode operating potential. It will be seen that the left half of tube V23A, or V23, has its grid 210 connected through resistor 212 to the plate circuit of gate tube V24A at the point 211. The grid voltage of V23A is therefore determined by the action of gate tube V24. The values of plate load resistors 213, 214, and 215 are so chosen that when the A half of V24 is non-conducting, which happens when a start pulse from source #1 reaches the grid 216 of V24A through lead 97, the grid voltage of tube V23A rises to approximately 115 volts. This grid voltage is sufficiently close to the cutoff value of V23A that incoming pulses of the frequency to be counted, which have a voltage of approximately 15 to 20 volts, will drive V23A to conduction. These pulses will therefore be reproduced in the plate circuit of the tube, and subsequently reach the counting decades to be counted.

When a stop pulse reaches the grid 218 of tube V24B through lead 102, it drives V24B to non-conduction, which by the trigger action of the tube drives V24A to conduction. When the A half of the tube conducts, the grid voltage of V23A drops to approximately 90 volts. This is far enough below the cutoff value of the tube that the amplitude of later incoming pulses of the unknown frequency will be insufficient to drive V23A to conduction. These pulses do not therefore appear in the plate circuit of the tube and hence do not reach the totalizing counter.

It will thus be seen that tube V24 acts as a gate. This tube, which is a normal trigger circuit having its grids separated, in effect opens a gate when a start pulse reaches one side of the tube to allow the unknown frequency to pass through tube V23 to the counting decades, and closes the gate when a stop pulse acts on the other half of V24 to prevent the unknown frequency from passing through V23. Since this is accomplished by switching of the grid voltage of V23A, the coupling network of this tube, comprising a capacitor 220 (Figs. 6 and 6A) and a resistor 212, is designed to provide a small time constant of approximately .03 microsecond, which makes possible the fast switching action needed.

With reference to the circuit of tube V24, resistors 225 and 226 act as voltage dividers for the plate circuit of V24A, while resistors 227 and 228 serve the same function for V24B. Plate potential is supplied through lead 341. Diodes 230 and 231 are placed in the circuit to prevent stray positive pulses from reaching the grids of V24 and causing a false operation of the gate, while resistors 232 and 233 provide a return path to the cathode for these diodes and also pair up with capacitors 234 and 235 respectively to form differentiating circuits and provide increased sharpness and definition for the incoming start and stop pulses. The tube is reset by the operation of the relay R, acting through conductor 340.

One of the important features of the gate circuit is that during the switching of the voltage of the grid of tube V23A, this grid voltage is always maintained below the tube cutoff value. If, for example, V23A were given a grid voltage above cutoff by a nonconducting condition of V24A, the result would be a plate current in V23A corresponding to this above-cutoff voltage, this current being independent of the incoming pulses of the unknown frequency. When V24A was driven to conduction, the grid voltage of V23A would drop below its cutoff value and the resulting loss of plate current would give an output square wave pulse in the plate circuit. This would not be too objectionable as long as it occurred only when pulses of the unknown frequency were passing through to be counted. However, if a pulse caused by the switching action were to occur in the absence of pulses of the unknown frequency, it would be transmitted to the counting decades to actuate them and give a false count. By keeping the grid voltage of V23A below its cutoff value during both positions of the gate, applicants have obtained an on-off switching action without giving rise to an output pulse which is the functional by-product of the switching action itself and have therefore avoided the creation of switching transients which would lead to an erroneous count on the counting decades.

V23B, the right half of tube V23, is an amplifier having a cathode follower output. This half of the tube receives negative pulses from the output of V23A and transmits them through conductor 336 to the first decade of the counting unit to be counted thereon.

In any system in which the cycles are counted directly, there is a possible variation of the cycle count depending upon the point of the cycle of the measured signal at which the timing interval is started and stopped. For a one second count, this would result in a variation of plus or minus one cycle per second, and for a ten second count would be plus or minus one tenth cycle per second. The effect of this type of error may therefore be minimized by increasing the time of count.

Another possible source of error lies in variations in the interval between timing pulses. This variation could arise through an error in the basic frequency, and through variations in the form of the generated pulse and in the operation of the sart-stop gate. In practice, variations in the timing interval are extremely small as the basic frequency is usually accurate to one part in $10^8$. Since the other two types of errors are not cumulative, lengthening of the counting interval will make the system accurate to the limits of the standard frequency.

The measurement error may be expressed by the following formula:

$$E = \pm \frac{1}{T}(1 + \Delta TF) \text{ cycles}$$

where:

$T$ = Counting time in seconds
$F$ = Measured frequency in cycles per second
$\Delta T$ = Error in determination of the time interval Thus if:

T is one second
F is 100,000 per second
$\Delta T$ is one part per million $$E = \pm 1\left(1 + \frac{100,000}{1,000,000}\right) = \pm 1.1 \text{ cycles}$$

and if T is ten seconds:

$$E = \pm \frac{1}{10}\left(1 + \frac{100,000}{1,000,000}\right) = \pm .11 \text{ cycle}$$

It will be seen from the above that the measurement error resulting from the use of applicants' method is extremely small, thus enabling the measuring circuit to conform to extreme accuracy requirements. With the system as described, accuracies ranging from 1 part in $10^6$ for a one second count and 1 part in $10^8$ for a 100 second count have been obtained.

Applicants' measuring system not only meets high accuracy standards, but also results in a large reduction in testing time over existing methods since they utilize a pushbutton-operated, cycle counting system. The counter is direct reading up to a frequency of 1.25 megacycles per second, and may be used on higher frequencies with the use of suitable frequency dividing equipment. The accuracy of the set is maintained over the entire range.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a system for measuring the frequency of an oscillating electrical signal wave, means for shaping the wave to form a train of peaked pulses and means for counting the peaked pulses comprising a source of accurately periodic timing pulses, a gate circuit for transmitting the peaked pulses, a first gate control circuit energized by a first timing pulse for opening the gate to transmit the pulses, an adjustable preset timing device also energized by said first timing pulse, a second gate control circuit, means controlled by the timing device for connecting the second circuit to the source of timing pulses, means in the second control circuit responsive to a second timing pulse for closing the gate, and a device connected to the gate circuit for counting and indicating the number of pulses passed by the gate circuit.

2. In a system according to claim 1 a circuit including a repeat key energized by the timing device at the end of each count when the key is closed for reconnecting the source of timing pulses to the first gate control circuit.

3. In a system for measuring the frequency of an oscillating electrical signal wave, means for shaping the wave to form a train of peaked pulses, a source of accurately periodic timing pulses, a device for counting and indicating the peaked pulses, a normally open circuit for transmitting the peaked pulses to the device, a first control circuit responsive to a pulse from the source of timing pulses for closing the normally open circuit, a second control circuit responsive to the timing pulses and means for connecting it to the source of timing pulses a predetermined time after the closing of the normally open circuit to reopen said circuit and a circuit connecting the output of the normally open circuit to the counting and indicating device.

4. In a system for measuring the frequency of an oscillating electrical signal wave, means for shaping the wave to form a train of peaked pulses and means for counting the peaked pulses comprising a source of accurately periodic timing pulses, a gate circuit for transmitting the peaked pulses, a first gate control circuit responsive to timing pulses for opening the gate to transmit peaked pulses, an adjustable preset timing device also energized by timing pulses, a first relay, means for energizing said relay, contacts on the energized first relay for simultaneously connecting the source of timing pulses to the first gate control circuit and to the timing device, a second normally released relay having contacts for releasing the first relay when the second relay is operated, means controlled by the timing device for operating the second relay, a second gate control circuit responsive to timing pulses for closing the gate, contacts on the released first relay connecting the source of timing pulses to the second gate control circuit and a device connected to the gate for counting and indicating the number of pulses passed by the gate.

5. A system according to claim 4 having a third relay, means controlled by the timing device for actuating the third relay at a predetermined time after said second relay is operated to release said second relay, a resetting relay momentarily operated by the released second relay, circuits for returning the system to a normal unactuated condition controlled by the operated resetting relay and means controlled by the released resetting relay for re-energizing the first relay to automatically start a new count.

References Cited in the file of this patent

UNITED STATES PATENTS

| | | |
|---|---|---|
| 2,403,873 | Mumma | July 9, 1946 |
| 2,403,918 | Grosdoff | July 16, 1946 |
| 2,404,047 | Flory et al. | July 16, 1946 |
| 2,497,320 | Miller | Sept. 10, 1946 |
| 2,510,485 | Vossberg | June 6, 1950 |
| 2,516,189 | Dinsmore | July 25, 1950 |
| 2,575,087 | Baker | Nov. 13, 1951 |
| 2,603,418 | Ferguson | July 15, 1952 |